(12) United States Patent
Haapanen

(10) Patent No.: US 12,348,508 B2
(45) Date of Patent: Jul. 1, 2025

(54) DISTRIBUTED OUTPUT DEVICE CREDENTIAL CACHING

(71) Applicant: Tom Haapanen, Ontario (CA)

(72) Inventor: Tom Haapanen, Ontario (CA)

(73) Assignee: Ricoh Company, Ltd., Tokyo (JP)

( * ) Notice: Subject to any disclaimer, the term of this patent is extended or adjusted under 35 U.S.C. 154(b) by 342 days.

(21) Appl. No.: 17/692,051

(22) Filed: Mar. 10, 2022

(65) Prior Publication Data

US 2023/0291727 A1    Sep. 14, 2023

(51) Int. Cl.
*H04L 9/40*    (2022.01)
*H04L 67/1097*    (2022.01)

(52) U.S. Cl.
CPC .......... *H04L 63/083* (2013.01); *H04L 63/102* (2013.01); *H04L 63/108* (2013.01); *H04L 67/1097* (2013.01)

(58) Field of Classification Search
CPC ........................ H04L 63/083; H04L 63/1097
See application file for complete search history.

(56) References Cited

U.S. PATENT DOCUMENTS

| | | | |
|---|---|---|---|
| 6,681,225 B1 | 1/2004 | Uceda-Sosa | |
| 6,834,298 B1 | 12/2004 | Singer | |
| 8,214,634 B1 * | 7/2012 | Steele | ................... H04L 9/3268 726/10 |
| 9,026,145 B1 | 5/2015 | Duleba | |
| 2013/0067043 A1 | 3/2013 | Gaitonde | |
| 2014/0325090 A1 | 10/2014 | Michelin | |
| 2014/0335787 A1 * | 11/2014 | Smadi | ..................... H04L 67/06 455/41.2 |
| 2016/0036777 A1 | 2/2016 | Bartlett | |
| 2016/0088020 A1 | 3/2016 | Chan | |
| 2017/0264570 A1 | 9/2017 | Bugenhagen | |
| 2017/0337051 A1 | 11/2017 | Bertani | |
| 2019/0034487 A1 | 1/2019 | Balachandran | |
| 2019/0245785 A1 | 8/2019 | Haapanen | |
| 2024/0056443 A1 * | 2/2024 | Stankoulov | ........... H04W 12/47 |

OTHER PUBLICATIONS

Haapanen, U.S. Appl. No. 15/892,378, filed Feb. 8, 2018, Notice of Allowance, Jun. 10, 2019.

* cited by examiner

*Primary Examiner* — Gil H. Lee
(74) *Attorney, Agent, or Firm* — Hickman Becker Bingham Ledesma LLP; Albert Lee

(57) ABSTRACT

An approach is provided for distributed output device credential caching. An output device authenticates a user for accessing the output device. The output device receives a request to access a protected remote resource. The output device determines that credentials, for accessing the protected remote resource, are not stored at the output device. The output device retrieves data that specifies output device peers. The output device obtains the credentials by querying the output device peers specified by the data that specifies the output device peers. The output device verifies that the credentials are currently valid for the protected remote resource. The output device services the request by accessing the protected remote resource using the credentials.

20 Claims, 5 Drawing Sheets

DISTRIBUTED OUTPUT DEVICE CREDENTIAL CACHING

RELATED APPLICATION DATA

This application is related to U.S. patent application Ser. No. 15/892,378 entitled "OUTPUT DEVICE DISCOVERY USING NETWORK SWITCHES", filed Feb. 8, 2018, now U.S. Pat. No. 10,447,592, the contents all of which are incorporated by reference in their entirety for all purposes as if fully set forth herein

FIELD

The technical field of the present disclosure relates to output devices, and more specifically to distributed output device credential caching.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

In offices, enterprises, and other sites with large physical spaces, output devices such as digital displays and multi-function printers (MFPs), also referred to herein as multi-function peripherals or printing devices, may be distributed and installed at various locations to support printing, scanning, copying, digital signage, digital whiteboards, and other document workflows in a load balanced manner for multiple users. When interacting with output devices, users may need read and/or write access to various protected systems such as file servers, content management systems, communication servers, repositories, storage devices, and other systems on local intranets or the Internet. To provide credentials for accessing these protected systems, users must often use a touchscreen or other input device integrated into the output devices. This manual authentication process may be time-consuming, inconvenient, and susceptible to data entry errors and third-party eavesdropping. Further, the credentials may only be valid for the specific output device used, and thus the process needs to be repeated when the user interacts with other output devices located at a site.

SUMMARY

An output device comprises one or more processors and one or more memories storing instructions. When the instructions are processed by the one or more processors, the output device authenticates a user for accessing the output device. The output device receives a request to access a protected remote resource. The output device determines that credentials, for accessing the protected remote resource, are not stored at the output device. The output device retrieves data that specifies output device peers. The output device obtains the credentials by querying the output device peers specified by the data that specifies the output device peers. The output device verifies that the credentials are currently valid for the protected remote resource. The output device services the request by accessing the protected remote resource using the credentials.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

Embodiments are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Distributed Output Device Credential Caching Architecture
   A. Output Device
   B. Management Server
III. Distributed Output Device Credential Caching Processes
   A. Obtaining Peer Group Data
   B. Querying for Credentials Among Peers
   C. Broadcasting Updates to Peers
IV. Implementation Examples
V. Additional Examples I. Overview An approach is provided for distributed output device credential caching. An output device authenticates a user for accessing the output device. The output device receives a request to access a protected remote resource. The output device determines that credentials, for accessing the protected remote resource, are not stored at the output device. The output device retrieves data that specifies output device peers. The output device obtains the credentials by querying the output device peers specified by the data that specifies the output device peers. The output device verifies that the credentials are currently valid for the protected remote resource. The output device services the request by accessing the protected remote resource using the credentials.

The approach described herein for providing distributed output device credential caching provides a technical solution to the technical problem of how to cache credentials among output devices in defined peer groups. The technical solution allows users to access protected resources across multiple output devices while providing credentials only once to an output device within a peer group, wherein the credentials can then be shared and distributed to other output devices in the peer group for caching. The technical solution allows users to more quickly access protected resources when interacting with output devices while avoiding centralized storage of cached credentials, thereby reducing possible attack vectors for credentials that would otherwise be stored on a local server and/or an external authentication service.

II. Distributed Output Device Credential Caching Architecture

Figure 1:
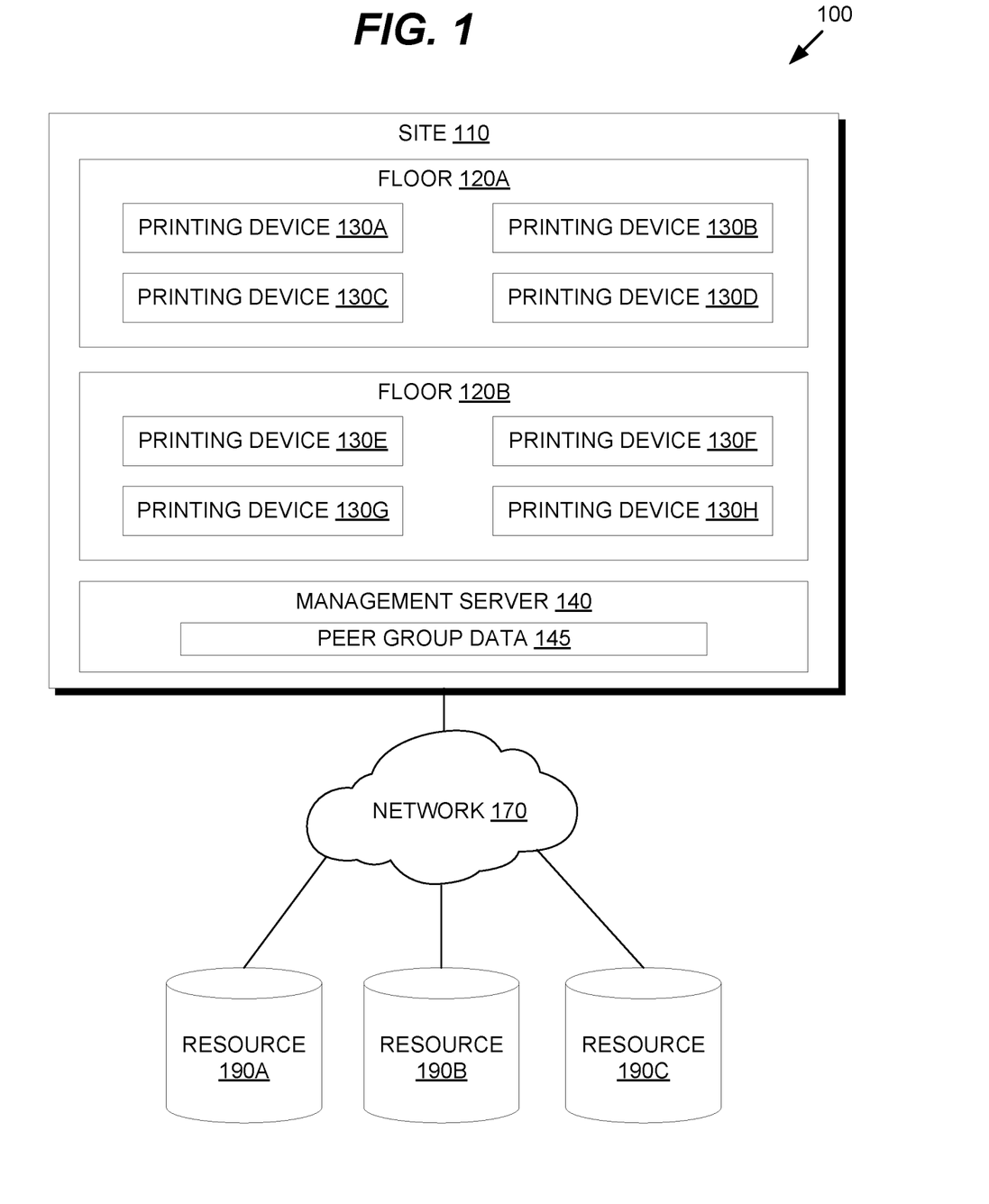
FIG. 1 is a block diagram that depicts a system for implementing distributed output device credential caching, as described herein.

FIG. 1 is a block diagram that depicts a system 100 for implementing distributed output device credential caching. System 100 includes printing device 130A, printing device 130B, printing device 130C, printing device 130D, printing device 130E, printing device 130F, printing device 130G, printing device 130H, management server 140, network 170, resource 190A, resource 190B, and resource 190C. Management server 140 includes peer group data 145. Printing device 130A, printing device 130B, printing device 130C, and printing device 130D are located on floor 120A. Printing device 130E, printing device 130F, printing device 130G, and printing device 130H are located on floor 120B. Floor 120A and floor 120B are located at site 110. Management server 140 is located at site 110. The site 110 is any physical location wherein multiple output devices are installed for users.

The elements of system 100 may be communicatively coupled via one or more wireless and/or wired computer networks of any type, such as network 170, local intranets, and/or direct communications links that are not depicted in FIG. 1 for purposes of explanation. System 100 may include additional or fewer elements, depending upon a particular implementation. The approach for configuring system 100 is described in the context of configuring printing devices 130A-130D in a peer group associated with floor 120A and printing devices 130E-130H in a peer group associated with floor 120B, wherein the printing devices access resources 190A-190C for purposes of explanation, but embodiments are applicable to configuring any number of output devices in any number of peer groups to access any number of protected resources. Thus, besides printing devices, other output devices such as digital signage and digital whiteboards may be included at a site.

A. Output Device

Figure 2:
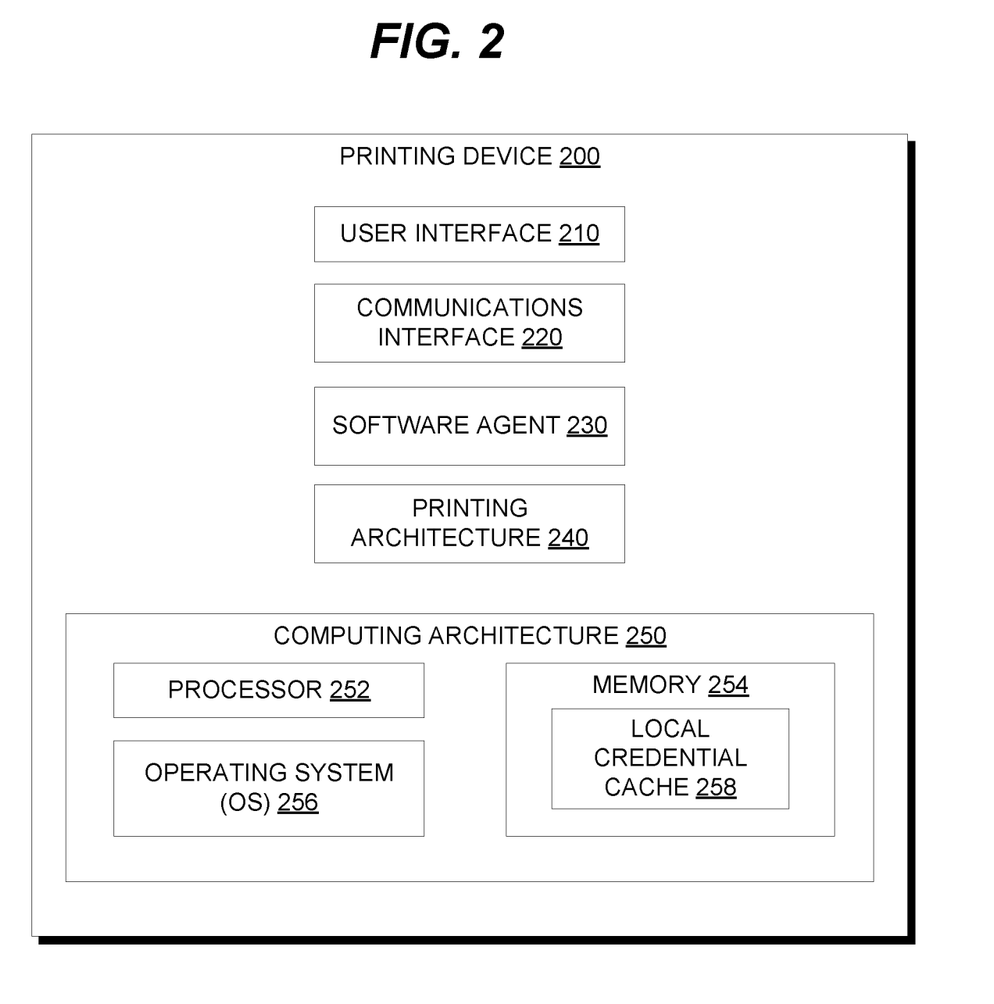
FIG. 2 is a block diagram that depicts an example implementation of an output device as a printing device.

The printing devices 130A-130G are devices that print print jobs, such as electronic documents. Embodiments are applicable to any type of output device and example output devices include, without limitation, printers, copiers, facsimile machines, Multi-Function Printers or Peripherals (MFPs), and display devices such as digital signage or digital whiteboards. FIG. 2 is a block diagram that depicts an example implementation of an output device, or printing device 200, that includes a user interface 210, a communications interface 220, a software agent 230, a printing architecture 240, and a computing architecture 250.

The user interface 210 allows a user to input information to the printing device 200 and/or displays information to the user. For example, the user interface 210 may be implemented by a display screen, a control panel, a keyboard, a pointing device such as a mouse, or any combination thereof. The user interface 210 may include graphical user interface controls displayed on a touch screen that convey information a user about the functionality and status of the printing device and also allow a user to select functions and input information to the printing device 200.

The user interface 210 also allows the user to provide credentials to login to the printing device 200 and to access protected resources, such as resources 190A-190C. The credentials may, for example, correspond to a username and password, certificates or other authentication data from a smart card, smartphone, employee badge, or other near field communication devices, a PIN code, a 1D or 2D barcode, a magnetic stripe card, or any combination of the above. For example, after submitting the user provided credentials to one of resources 190A-190C for authentication, documents based on scan, conversion, generation, printing, or other operations may be stored onto resources 190A-190C, or documents may be retrieved from resources 190A-190C for printing, transmitting to other devices, attaching to e-mails, format conversion, optical character recognition (OCR), local storage, or performing other tasks at printing device 200.

The communications interface 220 provides for the exchange of data between the printing device 200 and other computing elements via wired, wireless, or direct connections. The software agent 230 executes on printing device 200 to provide authentication services for logging in a user to the printing device 200 and for obtaining, caching, and sharing user credentials amongst a peer group of printing devices to facilitate access to various protected resources such as resources 190A-190C. The credentials may be encrypted and stored within local credential cache 258. For example, a symmetric encryption key may be pre-shared with printing devices within a peer group. The credentials may be further distributed using secure transmission channels to other printing devices for storage in their respective local credential caches. The software agent 230 may be implemented by one or more computer-implemented processes of any type. Furthermore, although the software agent 230 is depicted as a separate element for discussion purposes, the functionality provided by software agent 230 may be integrated into other processes and/or elements on printing device 200.

The printing architecture 240 includes hardware elements, software elements, or any combination of hardware elements and software elements for printing electronic data, such as print jobs. This may include, for example, a paper transport, logic circuits, a toner cartridge, a photosensitive drum, a laser, one or more coronas, a fuser, an erase lamp, power supply, etc.

The computing architecture 250 includes a processor 252, a memory 254, and an OS 256. The processor 252 may be implemented by one or more microprocessors and associated computer hardware and/or computer software. The memory 254 may be implemented by volatile memory, non-volatile memory, or any combination of volatile and non-volatile memory. The OS 256 may be implemented by any type of operating system that may vary depending upon a particular implementation.

B. Management Server

The management server 140 configures and manages peer groups of output devices stored in peer group data 145, as described herein. The management server 140 may be implemented by one or more processes, such as a cloud application, a server process, etc. For example, the management server 140 may be a process hosted on a server of a business organization, hosted as a cloud service accessible via the Internet, etc. The management server 140 may provide an Application Program Interface (API) for exposing the functionality and data of management server 140, including peer group data 145.

III. Distributed Output Device Credential Caching Processes

The approach described herein for distributed output device credential caching provides for authentication of a user at an output device, querying for cached credentials from an assigned peer group in response to a request to access a protected resource, validating received cached credentials for accessing the protected resource, and distributing the cached credentials to update the caches in the peer group in response to a successful validation. Embodiments are depicted in the figures and described herein in the context of system 100, but embodiments are not limited to this example.

A. Obtaining Peer Group Data

Figure 4:
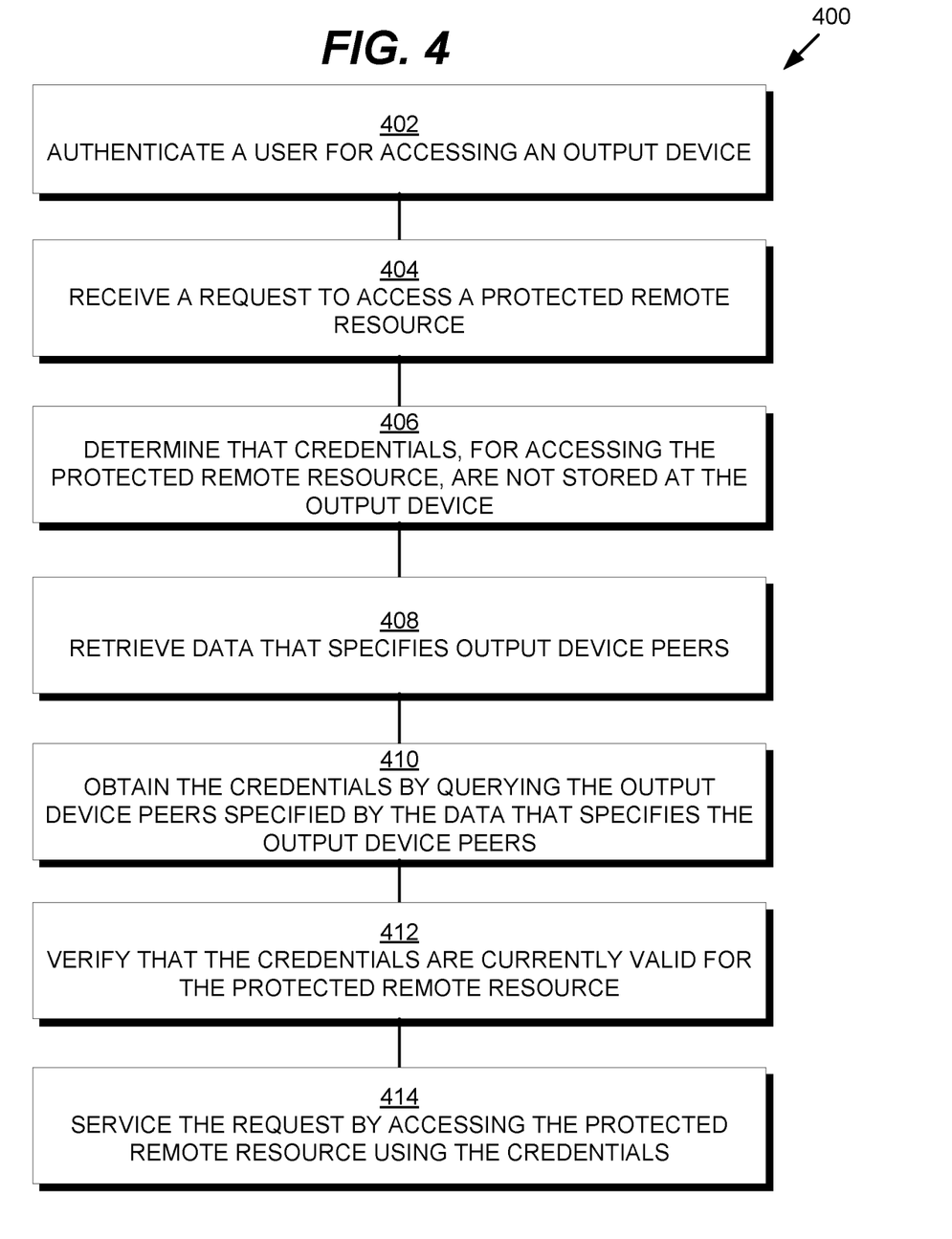
FIG. 4 is a flow diagram that depicts an approach for implementing distributed output device credential caching.

FIG. 4 is a flow diagram 400 that depicts an approach for implementing distributed output device credential caching. Starting in step 402, software agent 230 executing on processor 252 of printing device 200 authenticates a user for accessing printing device 200. For the purposes of illustration, the printing device 200 described in conjunction with FIG. 4 may correspond specifically to printing device 130A in FIG. 1. Further, for purposes of illustration, a printing device is used as an example, but any type of output device may be utilized. As discussed above, the user may perform one or more authentication actions such as entering a user/password pair, entering a PIN, or waving a smart card or employee badge to login to the printing device 200. For example, assume a user "John Doe" has successfully logged in to printing device 200 after step 402.

In step 404, software agent 230 executing on processor 252 of printing device 200 receives a request to access a protected remote resource. For example, the user "John Doe" may interact with user interface 210 to select one of resource 190A, 190B, or 190C for saving a document or retrieving a document. The resource selection and the action may be provided to software agent 230 as the request, wherein the action may correspond to saving (writing) or retrieving (reading) a document, e.g. by using an account on resource 190A, 190B, or 190C associated with the "John Doe" account logged in from step 402.

Figure 3:
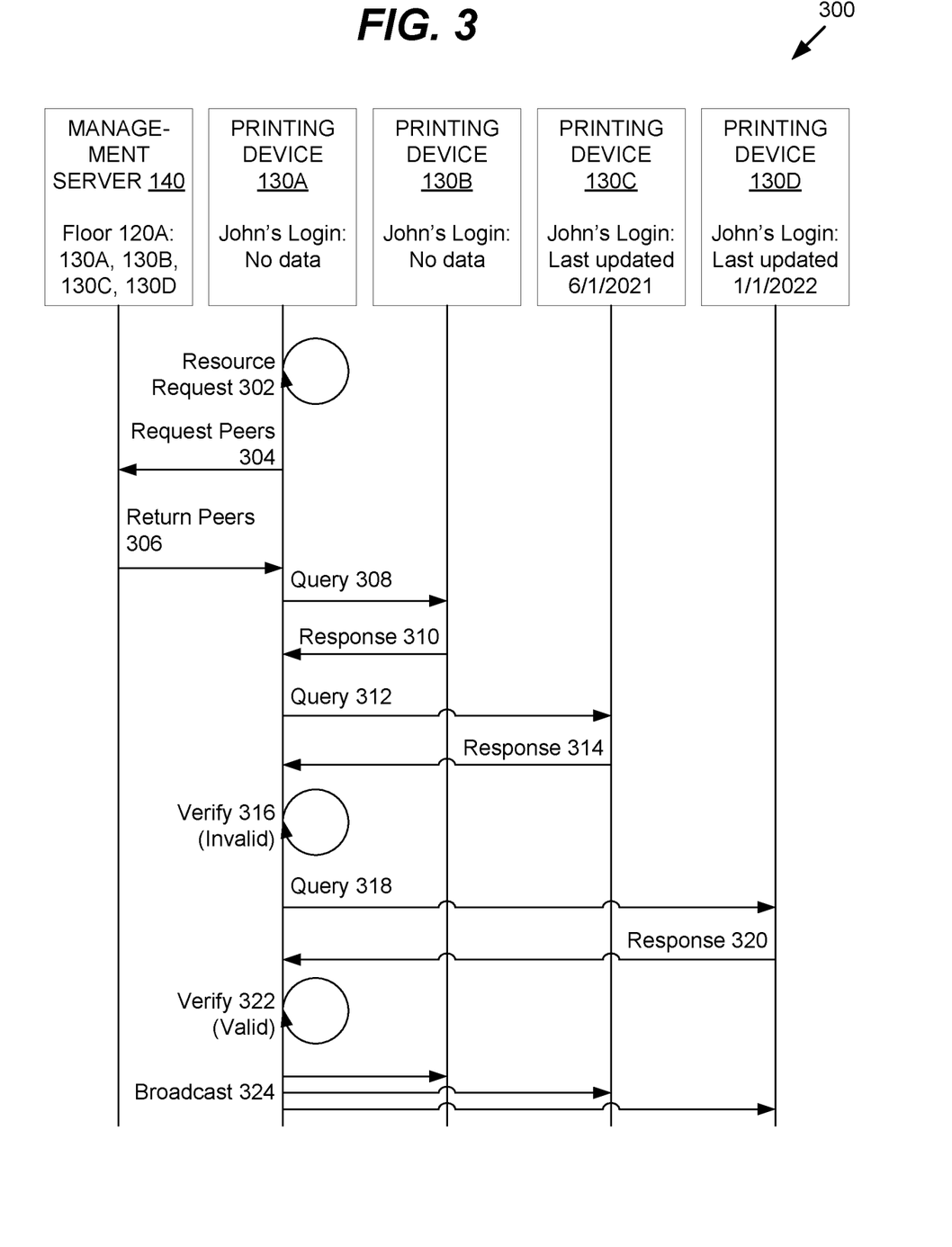
FIG. 3 is a message ladder diagram that depicts messages exchanged between the elements of the system in FIG. 1 when implementing distributed output device credential caching.

FIG. 3 is a message ladder diagram 300 that depicts messages exchanged between the elements in system 100 while proceeding through the steps of flow diagram 400. The contents of a local credential cache for resource 190A are illustrated in each of printing device 130A-130D in FIG. 3, and the content of peer group data 145 for floor 120A is illustrated in management server 140 in FIG. 3. The printing device 130A first receives a resource request 302, which may correspond to the request in step 404 described above. For example, the resource request 302 may correspond to a request to access resource 190A using an account associated with "John Doe" to upload and store a scanned document.

In step 406, software agent 230 executing on processor 252 of printing device 200 determines that the "John Doe" credentials for accessing resource 190A are not stored in local credential cache 258. For example, the local credential cache 258 may be queried if credentials for "John Doe" are available for resource 190A, and local credential cache 258 may return zero results, indicating no valid cache entries. At this point, a conventional printing device may simply prompt the user for the credentials. However, to avoid the inconvenience of this prompt, software agent 230 may instead proceed to query a peer group of printing devices to see if valid credentials can be retrieved from another printing device. Of course, if local credential cache 258 does include the credentials, then the process may instead skip to step 412.

In step 408, software agent 230 executing on processor 252 of printing device 200 retrieves data that specifies printing device peers for printing device 130A. To determine which devices are in the peer group that printing device 130A belongs to, printing device 130A may send a request peers 304 message to management server 140, as shown in FIG. 3. Management server 140 may perform a lookup in peer group data 145 for printing device 130A and/or the "John Doe" account and provide a return peers 306 reply message, wherein printing device 130A is identified to be in a peer group associated with floor 120A that includes printing device 130B, printing device 130C, and printing device 130D as the other peers. If the request peers 304 message was instead sent from e.g. printing device 130F, then the return peers 306 reply message may instead include printing device 130E, 130G, and 130H as the other peers of printing device 130F.

In some implementations, to avoid sending a request peers 304 message each time in step 408, the data that specifies printing device peers for printing device 130A may be cached locally at printing device 130A. In this case, printing device 130A may periodically request updated peer group data from management server 140, or management server 140 may push peer group updates to the printing device 130A. For example, when printing devices are added, moved, or decommissioned at site 110, or when users are assigned to different locations or offices, the membership of peer groups in peer group data 145 may be changed as a result. The changes are then propagated to the printing devices by the periodic updates or the push updates.

While the example illustrated in system 100 of FIG. 1 divides peer groups according to floors in site 110, any organization of peers may be defined according to business use cases and security considerations. For example, printing devices located in physical location such as one or more rooms, sections, or floors of a building may be defined as a peer group. By limiting the physical location size of the peer group, the sharing of the confidential user credentials can be limited to the printing devices that a user is more likely to be using on a day to day basis. For example, if a business determines that employees rarely use printing devices on floors where they do not have an office, then organizing the peer groups by floors may provide an optimal balance of cache availability and data security for the business.

While the above examples use device centric peer groups, peer groups may also be defined on a per user or per group basis. Thus, printing devices are not necessarily assigned to mutually exclusive peer groups, and printing devices can be members of multiple peer groups. For example, a user A may have offices on both floor 120A and 120B, whereas a user B may have offices only on floor 120B. In this case, a peer group assigned to user A may include printing devices on both floor 120A and 120B, whereas a peer group assigned to user B may include printing devices on floor 120B only.

In some implementations, the peer groups may be manually defined in peer group data 145, e.g. by an administrator or by IT staff. In other implementations, the peer groups may be automatically defined in peer group data 145. For example, peer groups may be automatically formed by including printing devices within specific network address ranges. In another example, peer groups may be automatically formed according to detecting the physical location of printing devices and grouping according to adjustable proximity settings, e.g. by room, section, floor, or building. For example, the techniques described in the related application "OUTPUT DEVICE DISCOVERY USING NETWORK SWITCHES" may be utilized to detect the physical position of each printing device for automatic assigning into peer groups of a specified proximity setting.

B. Querying for Credentials Among Peers

In step 410, software agent 230 executing on processor 252 of printing device 200 obtains the credentials for resource 190A by querying the printing device peers specified by the data retrieved from step 408. For example, referring to FIG. 3, printing device 130A may sequentially query the other peers indicated in step 408, or printing device 130B via query 308, printing device 130C via query 312, and printing device 130D via query 318. If a printing device is unresponsive, for example if the printing device is powered off, in a sleep mode, or has encountered an error, then printing device 130A may wait until a timeout period before querying the next peer device. In some implementations, the query 308, 312, and 318 may be carried out substantially in parallel for potentially faster results at the cost of additional network burst traffic.

Since printing device 130B does not store any cached credentials for the "John Doe" account at resource 190A, the response 310 may simply indicate that printing device 130B has no cached credentials available. Accordingly, the next peer, or printing device 130C may be queried via query 312. In this case, printing device 130C does have credentials available for resource 190A, which are timestamped as last known to be valid as of Jun. 1, 2021. The credentials may be provided in response 314 using a secure broadcast channel and encrypted using a symmetric key pre-shared among the members of the peer group, or printing devices 130A-130D.

In step 412, software agent 230 executing on processor 252 of printing device 200 verifies that the credentials obtained from step 410 are currently valid for resource 190A. For example, in the verify 316 step, software agent 230 may attempt to login to resource 190A using the credentials retrieved from printing device 130C timestamped Jun. 1, 2021. However, as indicated in FIG. 3, the verify 316 may fail, for example due to the password for the "John Doe" account changing sometime after Jun. 1, 2021. In this case, steps 410 and 412 may be repeated until credentials are obtained that do pass verification.

For example, the last remaining peer, or printing device 130D may be queried via query 318, and a response 320 may be provided by printing device 130D that includes credentials timestamped Jan. 1, 2022. This time, the verify 322 may succeed, and the querying process is complete.

Note that the querying process may halt or terminate as soon as a credentials are obtained that can be successfully verified at the protected resource. Thus, if printing device 130B had cached valid credentials, then the querying process may terminate early after verifying the credentials provided in response 310 and extraneous communication with printing device 130C and 130D can be avoided.

If no valid credentials can be obtained from querying the peer group in steps 410 and 412, then the user may be prompted to enter credentials, for example via user interface 210. The user entered credentials can then be verified in the same way that the cached credentials are verified.

In step 414, software agent 230 executing on processor 252 of printing device 200 services the request from step 404 by accessing resource 190A using the credentials validated in step 412. Thus, the document from the request in step 404 can be uploaded and stored at resource 190A.

C. Broadcasting Updates to Peers

Since the retrieved credentials are verified in step 412, the credentials can be updated with a timestamp corresponding to the current time and date and stored in local credential cache 258 for responding to future requests to access resource 190A at printing device 130A. Further, the credentials can be broadcast back to the other printing devices in the peer group for storage in respective local credential caches. For example, as shown in FIG. 3, the broadcast 324 message may be sent to printing devices 130B, 130C, and 130D so that each of the printing devices can update their respective local credential caches with the "John Doe" login information for resource 390A with an updated current timestamp. In some implementations, the broadcast step may be limited to a smaller subset of the peer group or may be omitted entirely according to balancing user convenience and credential security.

To prevent the caching of stale credentials, management server 140 may be configured with an expiration policy that is provided to each of the printing devices. The printing devices may then remove any locally cached credentials that have a timestamp that exceeds an expiration period defined in the expiration policy.

IV. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
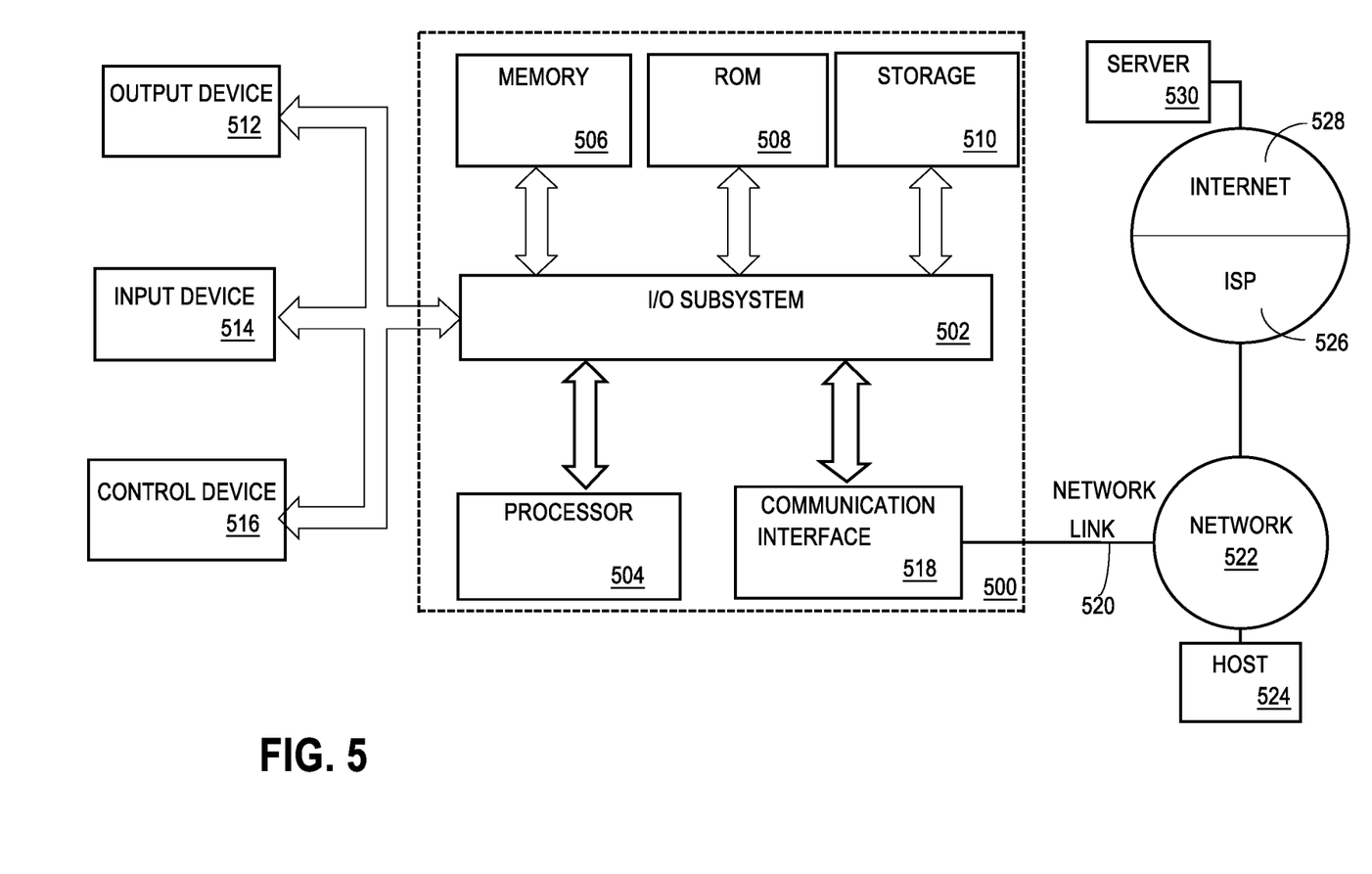
FIG. 5 is a block diagram that depicts an example computer system upon which embodiments may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

V. Additional Examples

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

A first clause is a computing system, the computing system including an output device including one or more processors, and one or more memories storing instructions which, when processed by the one or more processors, cause: authenticating a user for accessing the output device; receiving a request to access a protected remote resource; determining that credentials, for accessing the protected remote resource, are not stored at the output device; retrieving data that specifies output device peers; obtaining the credentials by querying the output device peers specified by the data that specifies the output device peers; verifying that the credentials are currently valid for the protected remote resource; and servicing the request by accessing the protected remote resource using the credentials.

A further clause is the computing system of the first clause, wherein the instructions, when processed by the one or more processors, further cause: storing the credentials for responding to future requests to access the protected remote resource.

A further clause is the computing system of the first clause, wherein the instructions, when processed by the one or more processors, further cause: storing the credentials and an associated timestamp for responding to future requests to access the protected remote resource; and invalidating the stored credentials when the associated timestamp exceeds a defined expiration period.

A further clause is the computing system of the first clause, wherein the instructions, when processed by the one or more processors, further cause: broadcasting, to the output device peers specified by the data that specifies the output device peers, the credentials for storing at the output device peers.

A further clause is the computing system of the first clause, wherein the credentials are associated with the user.

A further clause is the computing system of the first clause, wherein the request comprises at least one of: storing data onto the protected remote resource based on a scan, conversion, or generation operation of the output device; or retrieving data from the protected remote system for use by a print, conversion, or store operation of the output device.

A further clause is the computing system of the first clause, wherein the instructions, when processed by the one or more processors, cause retrieving the data that specifies the output device peers from a remote management server, and further cause updating of the data that specifies the output device peers by periodically querying the remote management server A further clause is the computing system of the first clause, wherein the instructions, when processed by the one or more processors, cause obtaining the credentials by querying the output device peers specified by the data that specifies the output device peers sequentially and halting the querying when the credentials are obtained.

A further clause is the computing system of the first clause, wherein the instructions, when processed by the one or more processors, cause obtaining the credentials by querying, substantially in parallel, the output device peers specified by the data that specifies the output device peers.

A further clause is the computing system of the first clause, wherein the instructions, when processed by the one or more processors, cause, after obtaining the credentials and prior to accessing the protected remote resource: determining that credentials, for accessing the protected remote resource, are currently invalid; causing a prompt to be displayed for the user to update the credentials; and confirming that the updated credentials, for accessing the protected remote resource, are currently valid.

A further clause is the computing system of the first clause, wherein the output device and the output device peers are associated with a physical location corresponding to one or more rooms, sections, or floors of a building.

A further clause is the computing system of the first clause, wherein the output device and the output device peers are associated with a network address range.

A second clause is one or more non-transitory computer-readable media storing instructions which, when processed by one or more processors cause: authenticating a user for accessing the output device; receiving a request to access a protected remote resource; determining that credentials, for accessing the protected remote resource, are not stored at the output device; retrieving data that specifies output device peers; obtaining the credentials by querying the output device peers specified by the data that specifies the output device peers; verifying that the credentials are currently valid for the protected remote resource; and servicing the request by accessing the protected remote resource using the credentials.

A further clause is the one or more non-transitory computer-readable media of the second clause, wherein the instructions, when processed by the one or more processors, further cause: storing the credentials for responding to future requests to access the protected remote resource.

A further clause is the one or more non-transitory computer-readable media of the second clause, wherein the instructions, when processed by the one or more processors, further cause: storing the credentials and an associated timestamp for responding to future requests to access the protected remote resource; and invalidating the stored credentials when the associated timestamp exceeds a defined expiration period.

A further clause is the one or more non-transitory computer-readable media of the second clause, wherein the instructions, when processed by the one or more processors, further cause: broadcasting, to the output device peers specified by the data that specifies the output device peers, the credentials for storing at the output device peers.

A further clause is the one or more non-transitory computer-readable media of the second clause, wherein the credentials are associated with the user.

A further clause is the one or more non-transitory computer-readable media of the second clause, wherein the request comprises at least one of: storing data onto the protected remote resource based on a scan, conversion, or generation operation of the output device; or retrieving data from the protected remote system for use by a print, conversion, or store operation of the output device.

A further clause is the one or more non-transitory computer-readable media of the second clause, wherein the instructions, when processed by the one or more processors, cause retrieving the data that specifies the output device peers from a remote management server, and further cause updating of the data that specifies the output device peers by periodically querying the remote management server A further clause is the one or more non-transitory computer-readable media of the second clause, wherein the instructions, when processed by the one or more processors, cause obtaining the credentials by querying the output device peers specified by the data that specifies the output device peers sequentially and halting the querying when the credentials are obtained.

A further clause is the one or more non-transitory computer-readable media of the second clause, wherein the instructions, when processed by the one or more processors, cause obtaining the credentials by querying, substantially in parallel, the output device peers specified by the data that specifies the output device peers.

A further clause is the one or more non-transitory computer-readable media of the second clause, wherein the instructions, when processed by the one or more processors, cause, after obtaining the credentials and prior to accessing the protected remote resource: determining that credentials, for accessing the protected remote resource, are currently invalid; causing a prompt to be displayed for the user to update the credentials; and confirming that the updated credentials, for accessing the protected remote resource, are currently valid.

A further clause is the one or more non-transitory computer-readable media of the second clause, wherein the output device and the output device peers are associated with a physical location corresponding to one or more rooms, sections, or floors of a building.

A further clause is the one or more non-transitory computer-readable media of the second clause, wherein the output device and the output device peers are associated with a network address range.

A third clause is a computer-implemented method comprising: authenticating a user for accessing an output device; receiving a request to access a protected remote resource; determining that credentials, for accessing the protected remote resource, are not stored at the output device; retrieving data that specifies output device peers; obtaining the credentials by querying the output device peers specified by the data that specifies the output device peers; verifying that the credentials are currently valid for the protected remote resource; and servicing the request by accessing the protected remote resource using the credentials.

A further clause is the computer-implemented method of the third clause, further comprising: storing the credentials for responding to future requests to access the protected remote resource.

A further clause is the computer-implemented method of the third clause, further comprising: storing the credentials and an associated timestamp for responding to future requests to access the protected remote resource; and invalidating the stored credentials when the associated timestamp exceeds a defined expiration period.

A further clause is the computer-implemented method of the third clause, further comprising: broadcasting, to the output device peers specified by the data that specifies the output device peers, the credentials for storing at the output device peers.

A further clause is the computer-implemented method of the third clause, wherein the credentials are associated with the user.

A further clause is the computer-implemented method of the third clause, wherein the request comprises at least one of: storing data onto the protected remote resource based on a scan, conversion, or generation operation of the output device; or retrieving data from the protected remote system for use by a print, conversion, or store operation of the output device.

A further clause is the computer-implemented method of the third clause, wherein retrieving the data that specifies the printing device peers is from a remote management server, and further comprising updating the data that specifies the printing device peers by periodically querying the remote management server.

A further clause is the computer-implemented method of the third clause, wherein obtaining the credentials is by querying the printing device peers specified by the data that specifies the printing device peers sequentially and halting the querying when the credentials are obtained.

A further clause is the computer-implemented method of the third clause, wherein obtaining the credentials is by querying, substantially in parallel, the printing device peers specified by the data that specifies the printing device peers.

A further clause is the computer-implemented method of the third clause, further comprising, after obtaining the credentials and prior to accessing the protected remote resource: determining that credentials, for accessing the protected remote resource, are currently invalid; causing a prompt to be displayed for the user to update the credentials;

and confirming that the updated credentials, for accessing the protected remote resource, are currently valid.

A further clause is the computer-implemented method of the third clause, wherein the printing device and the printing device peers are associated with a physical location corresponding to one or more rooms, sections, or floors of a building.

A further clause is the computer-implemented method of the third clause, wherein the printing device and the printing device peers are associated with a network address range.

The invention claimed is:

1. An output device comprising:
   one or more processors; and
   one or more memories storing instructions which, when processed by the one or more processors, cause:
   authenticating a user for accessing the output device;
   receiving a request to access a protected remote resource after the user is authenticated for accessing the output device;
   responsive to the request, retrieving data that specifies output device peers when one or more credentials, for accessing the protected remote resource, is determined to be not stored at the output device;
   obtaining the one or more credentials by querying the output device peers specified by the data, wherein at least one of the output device peers stores the one or more credentials; and
   accessing the protected remote resource using the obtained one or more credentials.

2. The output device of claim 1, wherein the instructions, when processed by the one or more processors, further cause:
   storing the one or more credentials and an associated timestamp for responding to future requests to access the protected remote resource; and
   invalidating the stored one or more credentials when the associated timestamp exceeds a defined expiration period.

3. The output device of claim 1, wherein the instructions, when processed by the one or more processors, further cause:
   broadcasting, to the output device peers specified by the data that specifies the output device peers, the one or more credentials for storing at the output device peers.

4. The output device of claim 1, wherein the request comprises at least one of:
   storing data onto the protected remote resource based on a scan, conversion, or generation operation of the output device; or
   retrieving data from the protected remote system for use by a print, conversion, or store operation of the output device.

5. The output device of claim 1, wherein the instructions, when processed by the one or more processors, cause retrieving the data that specifies the output device peers from a remote management server, and further cause updating of the data that specifies the output device peers by periodically querying the remote management server.

6. The output device of claim 1, wherein the instructions, when processed by the one or more processors, cause obtaining the one or more credentials by querying the output device peers specified by the data that specifies the output device peers sequentially and halting the querying when the one or more credentials is obtained.

7. The output device of claim 1, wherein the instructions, when processed by the one or more processors, cause obtaining the one or more credentials by querying, substantially in parallel, the output device peers specified by the data that specifies the output device peers.

8. The output device of claim 1, wherein the instructions, when processed by the one or more processors, cause, after obtaining the one or more credentials and prior to accessing the protected remote resource:
   determining that the one or more credentials, for accessing the protected remote resource, is currently invalid;
   causing a prompt to be displayed for the user to update the one or more credentials; and
   confirming that the updated one or more credentials, for accessing the protected remote resource, is currently valid.

9. The output device of claim 1, wherein the output device and the output device peers are associated with a physical location corresponding to one or more rooms, sections, or floors of a building.

10. The method of claim 1, further comprising, prior to accessing the protected remote resource using the obtained one or more credentials:
    verifying that the obtained one or more credentials is currently valid for the protected remote resource.

11. One or more non-transitory computer-readable media storing instructions which, when processed by one or more processors cause:
    authenticating a user for accessing an output device;
    receiving a request to access a protected remote resource after the user is authenticated for accessing the output device;
    responsive to the request, retrieving data that specifies output device peers when one or more credentials, for accessing the protected remote resource, is determined to be not stored at the output device;
    obtaining the one or more credentials by querying the output device peers specified by the data, wherein at least one of the output device peers stores the one or more credentials; and
    accessing the protected remote resource using the obtained one or more credentials.

12. The one or more non-transitory computer-readable media of claim 11, wherein the instructions, when processed by the one or more processors, further cause:
    storing the one or more credentials and an associated timestamp for responding to future requests to access the protected remote resource; and
    invalidating the stored one or more credentials when the associated timestamp exceeds a defined expiration period.

13. The one or more non-transitory computer-readable media of claim 11, wherein the instructions, when processed by the one or more processors, further cause:
    broadcasting, to the output device peers specified by the data that specifies the output device peers, the one or more credentials for storing at the output device peers.

14. The one or more non-transitory computer-readable media of claim 11,
    wherein the request comprises at least one of:
    storing data onto the protected remote resource based on a scan, conversion, or generation operation of the output device; or
    retrieving data from the protected remote system for use by a print, conversion, or store operation of the output device.

15. The one or more non-transitory computer-readable media of claim 11, wherein the instructions, when processed by the one or more processors, further cause, prior to accessing the protected remote resource using the obtained one or more credentials:

verifying that the obtained one or more credentials is currently valid for the protected remote resource.

16. A computer-implemented method comprising:

authenticating a user for accessing an output device;

receiving a request to access a protected remote resource after the user is authenticated for accessing the output device;

responsive to the request, retrieving data that specifies output device peers when one or more credentials, for accessing the protected remote resource, is determined to be not stored at the output device;

obtaining the one or more credentials by querying the output device peers specified by the data, wherein at least one of the output device peers stores the one or more credentials; and accessing the protected remote resource using the obtained one or more credentials.

17. The computer-implemented method as recited in claim 16, further comprising:

storing the one or more credentials and an associated timestamp for responding to future requests to access the protected remote resource; and invalidating the stored one or more credentials when the associated timestamp exceeds a defined expiration period.

18. The computer-implemented method as recited in claim 16, further comprising:

broadcasting, to the output device peers specified by the data that specifies the output device peers, the one or more credentials for storing at the output device peers.

19. The computer-implemented method as recited in claim 16, wherein the request comprises at least one of:

storing data onto the protected remote resource based on a scan, conversion, or generation operation of the output device; or retrieving data from the protected remote system for use by a print, conversion, or store operation of the output device.

20. The method of claim 16, further comprising, prior to accessing the protected remote resource using the obtained one or more credentials:

verifying that the obtained one or more credentials is currently valid for the protected remote resource.

* * * * *